Figure 1:
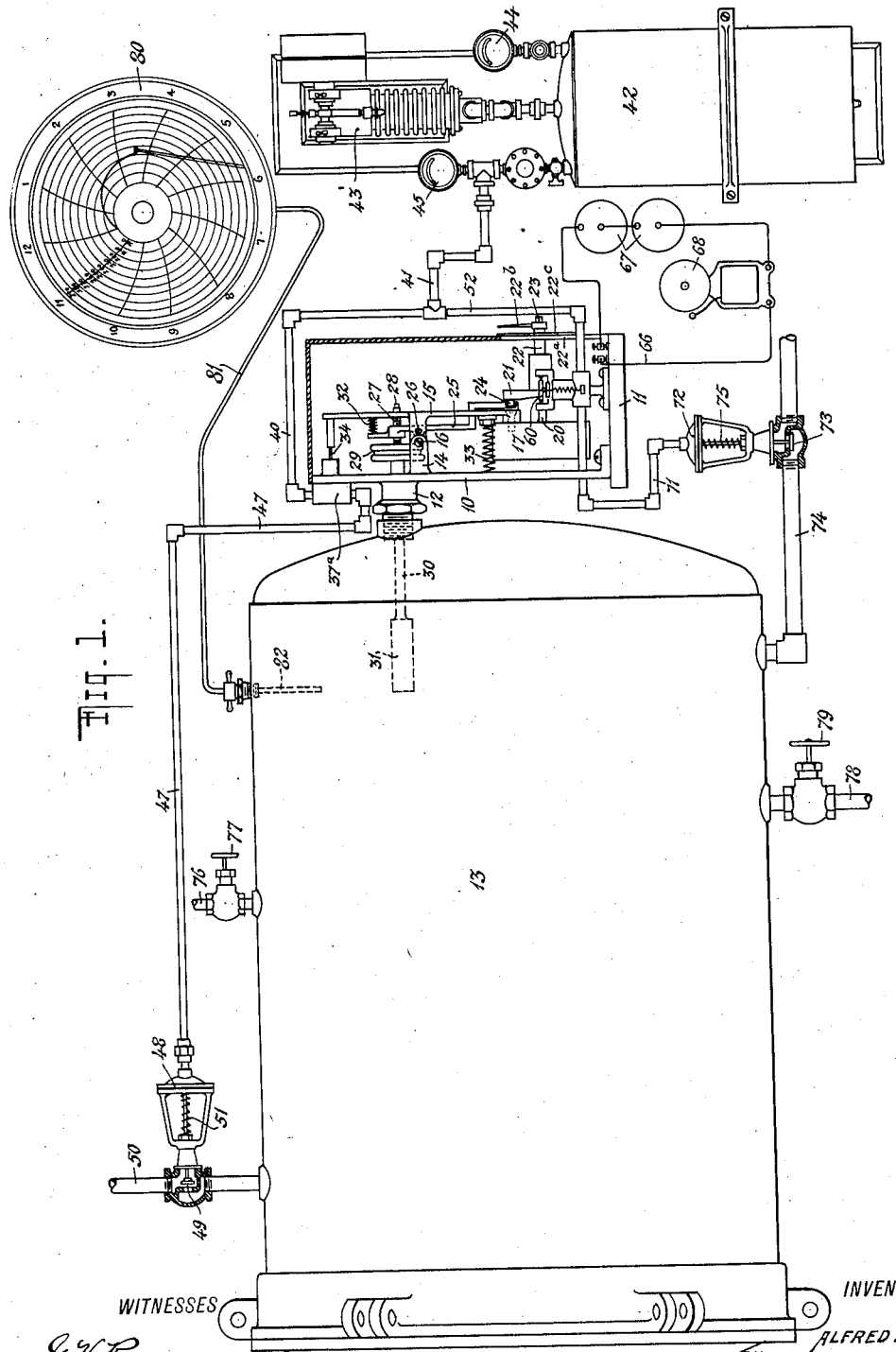

A. ROESCH.
TEMPERATURE CONTROLLER.
APPLICATION FILED AUG. 28, 1914.

1,333,221.

Patented Mar. 9, 1920.
2 SHEETS—SHEET 1.

WITNESSES

INVENTOR
ALFRED ROESCH
BY
ATTORNEYS

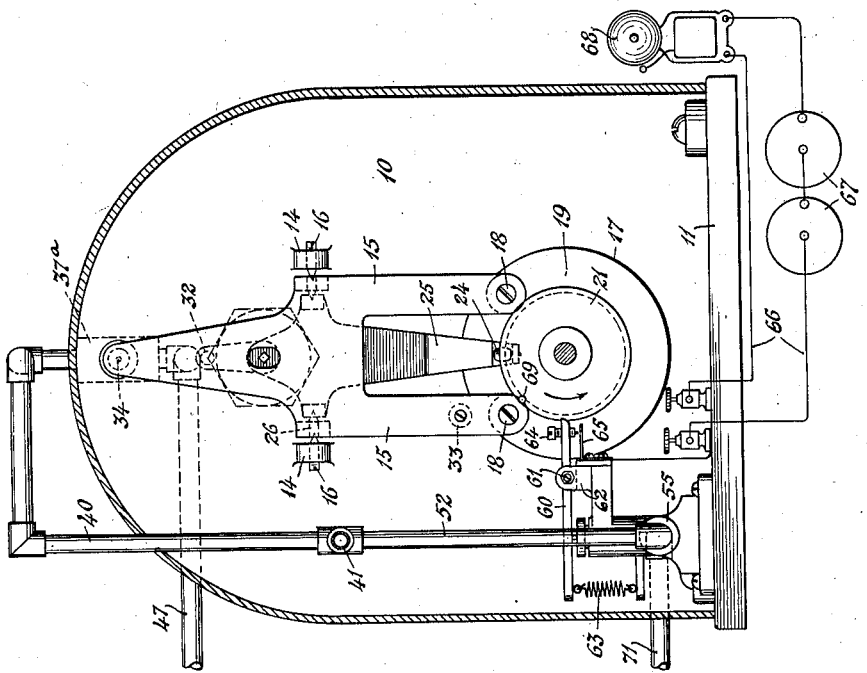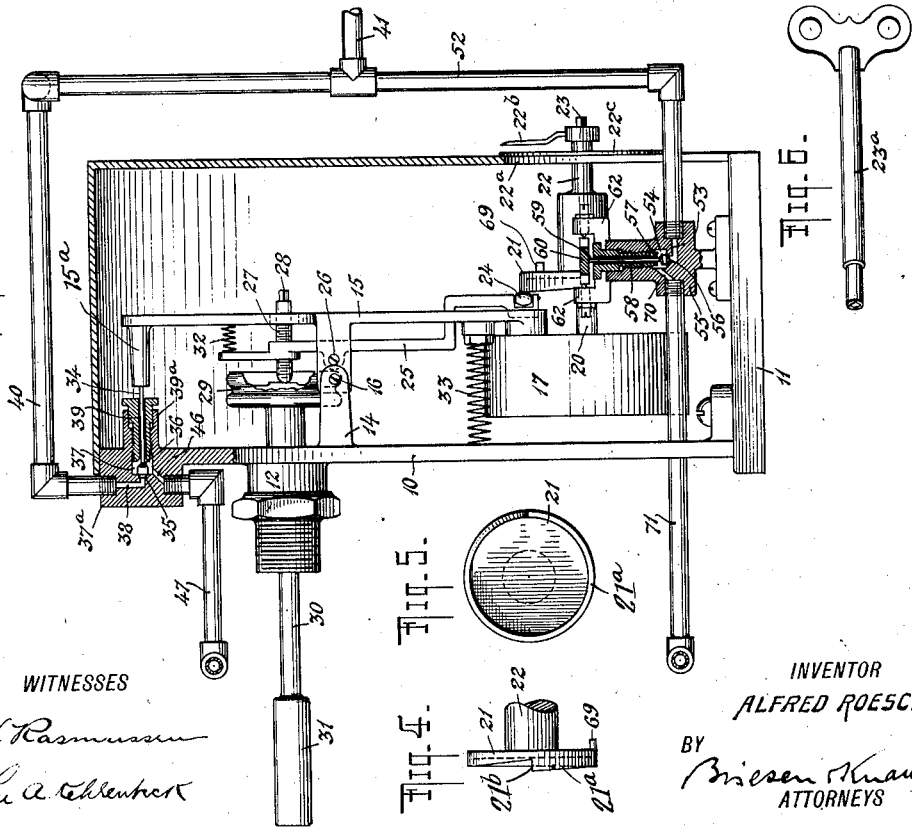

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

TEMPERATURE-CONTROLLER.

1,333,221.  Specification of Letters Patent.  Patented Mar. 9, 1920.

Application filed August 28, 1914. Serial No. 859,029.

*To all whom it may concern:*

Be it known that I, ALFRED ROESCH, a citizen of the United States, and a resident of the borough of Brooklyn, county of Kings, city and State of New York, have invented certain new and useful Improvements in Temperature-Controllers, of which the following is a specification.

My invention relates to temperature controllers and has for its object to provide a device which, within a given or predetermined period of time, will automatically control a heating or cooling medium in such a manner as to produce temperature changes at a predetermined place corresponding to any given temperature curve indicated, for instance, on a temperature chart. My improvement also contemplates the provision of means for automatically sounding an alarm at the end of the given or predetermined period of time and for coincidentally actuating a blow-off valve whereby the heating or cooling medium present at the predetermined place is quickly dissipated and any further effect thereof thus immediately prevented. Other objects of my invention will appear from the description hereinafter and the features of novelty will be pointed out in the appended claims.

Reference is to be had to the accompanying drawings which show an example of my improved controller and an application thereof and in which Figure 1 is a side elevation illustrating my invention combined with a vulcanizing plant; Fig. 2 is an enlarged similar view partly in section; Fig. 3 is a front elevation of my device; Figs. 4 and 5 are face and edge views of one form of actuating cam; and Fig. 6 is a detail view of a key used in connection with my device.

As illustrated in the drawings my improvement comprises an upright support 10 secured to or forming part of a base 11 and having an externally screw-threaded sleeve 12 adapted for connection with the element in which the temperature is to be controlled, the illustrated example showing a vulcanizer 13 of any well known type. The upright support 10 is further provided on its one face with lugs 14 between which a main lever 15 is pivoted at 16, said lever at its lower end carrying a casing 17 secured in position by means of screws 18 and containing an ordinary clock movement 19.

The hour spindle 20 of the latter extends through the casing 17 and carries a cam 21, templet or its equivalent which is preferably removably secured to said spindle by means of a frictional connection strong enough to cause the cam 21 to rotate with the said spindle 20, while permitting said cam to be adjusted relatively to the same in any convenient manner as by means of a stem 22 having an angular or squared end 23 for the accommodation of a suitable key $23^a$.

The stem 22 may, if desired, be rotatably supported adjacent to its free end by means of an upright plate $22^a$ secured to or forming part of the base 11 and in addition may carry a pointer $22^b$ movable across the face of a dial plate $22^c$ located on said plate $22^a$ and containing any suitable designations on its face, or merely containing an indication designating the starting point of the cam 21. These latter devices are, however, not absolutely necessary and may be omitted if desired. The cam 21 is arranged to coöperate with a roller 24 rotatably mounted at one end of an auxiliary lever 25 pivotally mounted at 26 on the main lever 15 and carrying an adjusting screw 27 provided with an angular or squared end 28 adapted to receive the key $23^a$ whereby said screw 27 may be actuated for the purposes to be more fully set forth hereinafter. The inner end of the screw 27 is located opposite to a capsular spring 29 connected by means of a tube 30 which extends through the sleeve 12, with a sensitive member 31, the latter in the present illustration being located within the vulcanizer 13 as clearly shown in Fig. 1. The said sensitive member 31 may be arranged to operate the said capsular spring 29 in any desired manner; for instance, said member may be filled with a volatile fluid adapted to expand and contract as the temperature in the vulcanizer 13 changes and thus expand and contract said spring, this being a well known arrangement. A relatively strong compression spring 32 is located above the pivots 16 and 26 between the free end of the auxiliary lever 25 and the main lever 15 and normally tends to separate said levers, the said spring in some cases surrounding the adjusting screw 27 between said levers. A relatively light compression spring 33 is located below the points 16 and 26 and has its one end in engagement with the support 10 and its opposite end abutting against the main lever 15, thus normally tending to move the lower end of said main lever 15 away from said support 10. At its upper end the main lever 15 carries a projection 15ᵃ located in alinement with a valve stem 34 secured to a combined inlet valve 35 and outlet valve 36 located in a chamber 37 of a valve body 37ᵃ and controlling respectively an inlet passage 38 and an outlet passage 39 formed in said valve body 39ᵃ, the latter being preferably formed integral with the upright support 10 as shown best in Fig. 2. The inlet passage 38 communicates with a branch pipe 40 connected by means of a main pipe 41 with a tank 42 in which air is compressed by means of the air compressor 43 suitable gages 44 and 45 being provided for indicating the pressure in the tank 42 and in the pipes 40 and 41. The valve body 37ᵃ is further formed with a channel 46 communicating with the chamber 37 and with a pipe 47 connected with the diaphragm chamber 48 of a diaphragm motor valve 49 located in the inlet pipe 50 through which steam or other heating medium is admitted to the vulcanizer 13, a coil spring 51 surrounding the stem of said valve 49 in the customary manner.

A second branch pipe 52 connects the main pipe 41 with an inlet channel 53 communicating with a chamber 54, both being formed in a valve body 55 secured to or forming a part of the base 11 as shown in Fig. 2. A combined inlet and outlet valve 56 and 57 is located in said chamber 54 and controls said inlet channel 53 and an outlet passage 58 also formed in said body 55 and surrounding the stem 59 by which the combined valve 56—57 is carried. The free end of the stem 59 is located adjacent to an arm or lever 60 pivotally mounted at 61 on lugs 62 forming part of or secured to the body 55 and movable against the tension of a coil spring 63 as clearly shown in Fig. 3. The said arm 60 carries a preferably adjustable contact member 64 adapted to coöperate under certain conditions to be more fully described hereinafter with a stationary contact member 65 to close an electrical circuit 66 including a source of electrical energy 67 and an alarm 68. The one end of the arm 60 extends into the path of a pin or projection 69 carried by and movable with the cam 21 whereby said arm 60 is actuated at the time the flow of the heating or cooling medium is cut off, or in other words is to be discontinued. An additional channel 70 is located in the valve body 55 and connects the chamber 54 thereof with a pipe 71 which in turn communicates with the diaphragm chamber 72 of a diaphragm motor valve 73 controlling a blow-off or exhaust pipe 74 extending from the vulcanizer 13, a coil spring 75 also surrounding the stem of said valve 73 as shown best in Fig. 1. In the illustrated example of an application of my invention 76 is an air vent controlled by a valve 77 and 78 is a drain pipe through which the products of condensation may be removed from the vulcanizer 13, the said drain pipe 78 being also controlled by a valve 79.

If desired the arrangement may include a temperature recording instrument whereby it may be determined if the apparatus is working satisfactorily and the desired temperature changes are being secured. In the illustration a twelve hour temperature recorder 80 of any well known construction is shown connected by means of a tube 81 with a sensitive member 82 secured to and extending into the vulcanizer 13 as shown in Fig. 1. The mechanism, if desired, may be protected by a cover 83 detachably secured in any suitable way to the support 10 and base 11.

The illustrated arrangement by way of example shows an application of my invention in which it is desired to start with a temperature of 200° F. and raise the same gradually to 210° F. in one hour, to 220° F. in two hours, to 227° in three hours, to 235° in four hours, to 245° in five hours, to 250° in six hours, to 255° in seven hours, to 265° in eight hours, to 267° in nine hours, and to 270° F. in ten hours and to cut off the supply of heating medium, which in the present instance is steam at fifteen minutes after the tenth hour thus producing a gradual rise in temperature of varying degrees and a completion of the vulcanizing process in ten hours and fifteen minutes. To secure this result the cam 21 as shown in Figs. 4 and 5 is provided with a gradually more or less regularly inclined surface 21ᵃ with a transverse portion 21ᵇ connecting the highest and lowest portions thereof. To obtain different variations in temperature the cam 21 is shaped to correspond in each individual instance as will be clear from the description of the operation which follows.

The adjusting screw 27 is first set at 200° and the cam 21 is adjusted to its starting point by means of the key 23ᵃ in which position the roller 24 is in engagement with the lowest portion of the surface 21ᵃ and the steam is turned on, it being assumed that the clock movement has been previously started. The sensitive member 31 being substantially cold at the start of the operation, the capsular spring 29 will be contracted and out of contact with the adjusting screw 27 so that the projection 15ᵃ on the lever 15 under the influence of the spring 33 will press the combined valve 35—36 down as shown in Fig. 2. In this condition of the parts the diaphragm chamber 48 is in communication with the atmosphere through the pipe 47 channel 46, chamber 37 and passage 39 so that the motor valve 49 is open and steam is admitted to the vulcanizer 13. In consequence the sensitive member 31 becomes heated so that the volatile fluid therein expands and in turn expands the capsular spring 29 toward the right in Fig. 2 which spring finally engages the adjusting screw 27 as the temperature in the vulcanizer 13 reaches 200°. As the movement of the capsular spring 29 toward the right in Fig. 2 continues under the influence of the rising temperature in the vulcanizer 13 pressure will be exerted by said spring 29 upon the adjusting screw 27 which as a result is also moved toward the right in said figure. This movement of said screw 27 causes the auxiliary lever 25 to swing upon its pivot 26, the upper end of said lever moving also toward the right, which movement will be transmitted through the medium of the spring 32 to the upper portion of the main lever 15. As a result of this the latter will be swung upon its pivot 16 to compress the spring 33 and said lever 15 and all of the elements carried thereby, including the auxiliary lever 25 will assume a tilted position without, however, changing the relation between the cam 21, the auxiliary lever 25 and the spring 32, with reference to the main lever 15; that is to say, during this operation the levers 15 and 25 move substantially as a unit upon the pivot 16 and thereby move projection 15$^a$ toward the right in Fig. 2 and away from the end of the stem 34. The latter is thus relieved from restraint so that the combined valve 35—36 will be moved by the air pressure in the pipe 40 and passage 38 to partially or completely close the outlet passage 39 and to establish communication between the diaphragm chamber 48 and the air tank 42 through the pipe 47, channel 46, chamber 37, passage 38, and pipes 40 and 41. Air under pressure will thus rush into said diaphragm chamber 48 and will actuate the diaphragm therein to partially or entirely close the valve 49 against the tension of the spring 51 and thus partially or entirely shut off the supply of steam to the vulcanizer 13. At the same time, because of the action of the clock work 19, the cam 21 is being rotatably advanced and thus, by exerting pressure upon the roller 24, swings the lower end of the auxiliary lever 25 inwardly or toward the left in Fig. 2, whereby said lever 25 is rocked upon the pivot 26 relatively to the main lever 15 to compress the spring 32 and move the inner end of the adjusting screw 27 away from and out of contact with the capsular spring 29. This relative pivotal movement of the auxiliary lever 25 is possible because it is pivoted upon the main lever 15. As the adjusting screw 27 is thus moved away from the capsular spring 29 and its restraining force thus removed from said screw 27, the spring 33 will swing the main lever 15 and with it all the elements it carries including the auxiliary lever 25, upon the pivot 16 in a direction to bring the projection 15$^a$ into engagement with the stem 34 so that the combined valve 35—36 will again be pressed down to open the outlet passage 39 and to close the air inlet passage 38. The compressed air in the diaphragm chamber 48 will immediately rush out through the pipe 47, channel 46, chamber 37 and passage 39 and the valve 49 will be opened by the action of the spring 51 to again admit a supply of steam to the vulcanizer 13. The temperature in the latter is thus further raised and the capsular spring 29 actuated to a further degree by the volatile fluid in the sensitive member 31. The further expansion of the capsular spring 29 continues during this step until said spring overtakes and again contacts with and actuates the adjusting screw 27. As the said adjusting screw 27 is again moved by the capsular spring 29 as described, the main and auxiliary levers 15 and 25 will again be vibrated on their respective pivots and in consequence will move the projection 15$^a$ away from the stem 34. The air pressure will now again actuate the combined valve 34—36 to partially, or entirely close the outlet passage 39 and to partially or entirely open the air inlet channel 38 and thus again permit compressed air to rush into the diaphragm chamber 48 and again actuate the diaphragm therein to again partially or entirely close the valve 49 and thus again reduce or cut off the flow of steam to the vulcanizer 13. As the cam 21 continues to rotate these operations will be repeated as the various designated degrees of temperature are reached in the vulcanizer and the supply of steam to the vulcanizer will be periodically throttled or cut off and again turned on so that the desired temperature curve is automatically and accurately followed throughout the process and until the predetermined period of time has passed. In the present case the throttling or cutting off of the steam to the vulcanizer 13 takes place successively during the entire process and predetermined period of time as described to produce the particular variations in temperature hereinbefore mentioned, the cam 21 being shaped to insure this result. As the cam 21 continues to rotate the roller 24 will finally reach the highest end thereof and, if free to do so, would drop therefrom along the transverse portion 21$^b$ to the lowest end of said cam, under the action of the spring 32, and thus tend to swing the upper end of the auxiliary lever 25 to the left in Fig. 2. As the adjusting screw 27 is, however, in contact with the capsular spring 29 this pivotal movement of said lever 25 is resisted with the result that the cam 21, clockwork 17 and connected parts move to the left in Fig. 2 relatively to the roller 24, under the influence of the spring 32, as soon as said roller has passed beyond the highest end of said cam 21. This movement to the left of the parts mentioned is communicated to the main lever 15 which is accordingly rocked on its pivot 16 in a direction to move the projection 15ª away from the stem 34. The pressure of the compressed air in the pipe 40 will now be free to move the valve 35—36 to completely close the outlet passage 39 and to completely open the air inlet channel 38 so that air under pressure now passes through the chamber 37, passage 46 and pipe 47 into the diaphragm chamber 48 and causes a complete closing of the valve 49 and a complete cutting off of the flow of steam to the vulcanizer 13. At the same time, the projection 69 engages the end of the arm 60 and swings the same on its pivot 61 against the tension of the spring 63 and thus brings the contact member 64 into engagement with the contact member 65 whereby the electrical circuit 66 is closed and the alarm 68 is sounded. The described actuation of the arm 60 also moves it away from the stem 59 and permits the compressed air in the pipe 52 and channel 53 to raise the combined valve 56—57 and close the outlet passage 58 and open communication between said pipe 52 and the pipe 71 through the channel 53, chamber 54, and passage 70. Compressed air is thus free to enter the diaphragm chamber 72 and actuate the diaphragm therein to open the valve 73 whereby any steam remaining in the vulcanizer 13 is quickly blown off or exhausted through the pipe 74 so that said steam will have no further effect on the temperature in the vulcanizer 13. These latter operations take place coincidentally at the end of the predetermined period of time, in the present example ten hours and fifteen minutes, and result in a complete cutting off of the flow of live steam to the vulcanizer 13, a complete blow-off of steam remaining therein and the sounding of an alarm immediately at the end of the particular process in hand.

During the operation of the apparatus as described and illustrated, the sensitive member 82 will actuate the pointer or needle of the recording instrument 80 so that the resulting chart which is produced by this means will at all times immediately show whether the desired temperature curve is being secured and whether the apparatus is working satisfactorily in the desired manner.

It will, of course, be understood that any desired fluctuations or variations may be secured in a given time in the same manner as described by simply shaping the cam 20 properly and combining same with the apparatus in the illustrated manner.

My improvement thus provides an absolutely reliable apparatus of the simplest form and capable of controlling temperature variations to any desired degree within a given space of time, even to the minute variation of one degree and of being readily combined with any type of apparatus wherein an absolutely predetermined control of temperature is desired.

My invention is entirely automatic in action and does away with the necessity for the services of an operator which are absolutely necessary in constructions at present in use. In such constructions it is necessary for the said operator to keep a constant watch on the time and on the temperature and to manually adjust the apparatus for each variation in order to obtain what, at best, are merely approximately accurate results. My improvement on the contrary, after being set in operation, needing no special attention and being absolutely automatic in operation will accurately produce the intended results and constantly reproduce the same as often as desired.

Various changes in the specific form shown and described may be made within the scope of the claims without departing from the spirit of my invention.

I claim:

1. A temperature controller comprising means for regulating the flow of a heating or cooling medium to a given point, means for actuating said regulating means whereby temperature variations following a predetermined curve are produced at said given point within a given period of time, and mechanism whereby the operation of said actuating means is controlled and whereby a complete closing of the regulating means is automatically brought about when the end of the predetermined curve is reached.

2. A temperature controller comprising a valve for controlling the flow of a heating or cooling medium to a given point, a connection from said valve to a source of compressed fluid whereby said valve is actuated to regulate the flow of said medium, mechanism for controlling the flow of said fluid whereby temperature variations following a pre-determined curve are produced at said given point within a given period of time, and means whereby the operation of said mechanism is controlled and whereby a complete closing of said valve is automatically brought about when the end of the predetermined curve is reached.

3. A temperature controller comprising means for controlling the flow of a heating or cooling medium to a given point, a sensitive member influenced by the temperature at said given point, devices actuated in unison by said sensitive member to close said controlling means, and means for causing an independent operation of one of said devices to open said controlling means.

4. A temperature controller comprising a double valve controlling a connection with a source of compressed fluid and a connection with the atmosphere, a diaphragm motor valve controlling the flow of a heating or cooling medium, a connection between said double valve and said diaphragm motor valve, pivoted means connected with said double valve, a sensitive device for actuating said pivoted means to operate said double valve and open said compressed fluid connection whereby said motor valve is actuated to reduce the flow of said medium, a cam for actuating said pivoted means independently of said sensitive device to operate said double valve and open said connection with the atmosphere whereby said motor valve is actuated to increase said flow and mechanism for actuating said cam.

5. The combination of a diaphragm motor valve controlling the flow of a heating or cooling medium, means for causing an actuation of said motor valve, a pivoted main lever adapted to actuate said means, a cam rotatably carried by said main lever, mechanism carried by said main lever for actuating said cam, a sensitive device, an auxiliary lever pivotally mounted on said main lever and arranged to be moved by said cam relatively to said main lever and said sensitive device, a spring located between said levers whereby said levers are caused to move together under the influence of said sensitive device and a second spring for moving said main lever relatively to said auxiliary lever to actuate said means.

6. The combination of a diaphragm motor valve controlling the flow of a heating or cooling medium, means for causing an actuation of said motor valve, a pivoted main lever adapted to actuate said means, a cam rotatably carried by said main lever, mechanism carried by said main lever for actuating said cam, a sensitive device, an auxiliary lever pivotally mounted on said main lever and arranged to be moved by said cam relatively to said main lever and said sensitive device, a spring located between said levers whereby said levers are caused to move together under the influence of said sensitive device, a second spring for moving said main lever relatively to said auxiliary lever to actuate said means, a blow-off, a valve controlling said blow-off, and means connected with said cam for opening said valve at a predetermined time.

7. The combination of a diaphragm motor valve controlling the flow of a heating or cooling medium, means for causing an actuation of said motor valve, a pivoted main lever adapted to actuate said means, a cam rotatably carried by said main lever, mechanism carried by said main lever for actuating said cam, a sensitive device, an auxiliary lever pivotally mounted on said main lever and arranged to be moved by said cam relatively to said main lever and said sensitive device, a spring located between said levers whereby said levers are caused to move together under the influence of said sensitive device, a second spring for moving said main lever relatively to said auxiliary lever to actuate said means, an electrical circuit including an alarm, and means connected with said cam for closing said circuit to sound said alarm.

8. The combination of a diaphragm motor valve controlling the flow of a heating or cooling medium, means for causing an actuation of said motor valve, a pivoted main lever adapted to actuate said means, a cam rotatably carried by said main lever, mechanism carried by said main lever for actuating said cam, a sensitive device, an auxiliary lever pivotally mounted on said main lever and arranged to be moved by said cam relatively to said main lever and said sensitive device, a spring located between said levers whereby said levers are caused to move together under the influence of said sensitive device, a second spring for moving said main lever relatively to said auxiliary lever to actuate said means, a blow-off, a valve controlling said blow-off, an electrical circuit including an alarm and means connected with said cam for coincidentally opening said valve and closing said circuit to sound said alarm at a predetermined time.

9. A temperature controller comprising mechanism for automatically controlling the flow of a heating or cooling medium to a given point whereby the temperature at said given point is controlled and means actuated by said mechanism whereby said medium is permitted to escape from said given point when a final temperature has been reached thereat.

10. The combination of an element in which temperature regulation is desired, a connection from a source of temperature varying medium to said element, a valve in said connection for controlling the flow of said medium to said element, a connection from said valve to an actuating medium, means controlling said valve connection, a pair of levers adapted to move in unison and independently, means controlled by the temperature in said element to actuate said levers in unison to operate the means controlling the said valve connection whereby said valve is closed, and means for moving one of said levers independently of the other to permit said other lever to actuate said valve connection controlling means whereby the valve is opened.

11. The combination of a fluid containing member, admission means thereto and discharge means therefrom and an automatic governing mechanism controlling said admission means responsively to temperature conditions in said member and to time, and controlling said discharge means responsively to time.

12. The combination of a fluid containing member, admission means thereto and discharge means therefrom and an automatic governing mechanism controlling said admission means responsively to temperature conditions in said member and controlling said discharge means responsively to time.

13. The combination of a fluid containing member, fluid admission means thereto and discharge means therefrom, a temperature responsive device in the fluid containing member, a movable cam having a contour which conforms to a desired time temperature characteristic, time controlled means for moving the cam, means whereby the temperature responsive device is caused to coöperate with the contour of the cam to control the fluid admission means according to said time temperature characteristic, and means operated by said time controlled means for controlling said discharge means.

14. The combination with a device to be regulated, a regulating device therefor, and a device responsive to the temperature of the device to be regulated, of a movable templet having a contour that conforms to a desired time-temperature characteristic, and means controlled by the coöperation of the templet and the temperature-responsive device for controlling the regulating device.

15. The combination with a device to be regulated, a regulating device therefor, and a device responsive to the temperature of the device to be regulated, of a movable templet having a contour that conforms to a desired time-temperature characteristic, time controlled means for moving the templet, and means whereby the temperature responsive device and the contour of the movable templet coöperate to control the heat regulating device according to said time-temperature characteristic.

16. In a temperature regulating device, the combination of a heat sensitive element containing an expansible fluid, a distant expansible element the expansion of which is controlled by the temperature conditions adjacent to said heat sensitive element, a valve for controlling the supply of heating fluid, fluid-pressure means for controlling said valve, a second valve operated by the expansible element for controlling said fluid-pressure means, and a clock for changing the relative adjustment of said expansible element and the second valve whereby to secure specified temperatures at predetermined times, substantially as described.

17. A temperature controller comprising means for automatically effecting a predetermined series of changes of temperature at predetermined periods of time, a thermo-sensitive member responsive to the temperatures actually set up, and means controlled by said member to counteract, in the temperatures actually set up, departures from the temperatures called for by said first means.

18. A temperature controller comprising means for automatically effecting a predetermined series of changes of temperature at predetermined periods of time by controlling the flow of a temperature imparting medium, a thermo-sensitive member responsive to the temperatures actually set up, and means controlled by said member and also operative upon the flow of said temperature imparting medium to counteract, in the temperatures actually set up, departures from the temperatures called for by said first means.

19. The combination of an element to be regulated as to temperature, a regulating device therefor, a device responsive to the temperature of the element to be regulated, a movable templet having a contour conforming to a predetermined time-temperature characteristic and means including a lever coöperating with the templet and temperature responsive device to control said regulating device.

20. The combination of an element to be regulated as to temperature, a regulating device therefor, a device responsive to the temperature of the element to be regulated, a movable templet having a contour conforming to a predetermined time-temperature characteristic, a main lever and an auxiliary lever pivotally mounted thereon, one of said levers engaging said templet and the other of said levers having an operative connection with said temperature responsive device whereby said templet and temperature responsive device in coöperation with said levers control said regulating device.

In testimony whereof I have hereunto set my hand in the presence of two subscribing witnesses.

ALFRED ROESCH.

Witnesses:
 JOHN A. KEHLENBECK,
 FRANK F. KIRKPATRICK.